United States Patent [19]
Heinig

[11] Patent Number: 5,540,551
[45] Date of Patent: Jul. 30, 1996

[54] METHOD AND APPARATUS FOR REDUCING VIBRATION IN A TURBO-MACHINE BLADE

[75] Inventor: Roger W. Heinig, Cocoa Beach, Fla.

[73] Assignee: Westinghouse Electric Corporation, Pittsburgh, Pa.

[21] Appl. No.: 285,665

[22] Filed: Aug. 3, 1994

[51] Int. Cl.$^6$ ............................................. F01D 5/22
[52] U.S. Cl. ..................... 416/190; 416/196 R; 416/203
[58] Field of Search ................................. 416/203, 190, 416/191, 193, 194, 195, 196 R

[56] References Cited

U.S. PATENT DOCUMENTS

| | | | |
|---|---|---|---|
| Re. 32,737 | 8/1988 | Ortolano | 416/190 |
| 1,502,904 | 7/1924 | Campbell | 416/191 |
| 1,618,284 | 2/1927 | Hodgkinson | 416/196 R |
| 1,618,285 | 2/1927 | Kasley | 416/196 R |
| 1,888,795 | 11/1932 | Faber | 416/196 R |
| 2,258,773 | 10/1941 | Kroon | 253/39 |
| 2,454,115 | 11/1948 | Allen | 416/196 R |
| 2,472,886 | 6/1949 | Conrad et al. | 416/196 R |
| 3,426,535 | 2/1969 | Mlacker et al. | 416/203 |
| 3,584,971 | 6/1971 | Ortolano | 416/218 |
| 3,588,278 | 6/1971 | Ortolano et al. | 416/190 |
| 3,606,578 | 9/1971 | Ortolano et al. | 416/191 |
| 3,700,353 | 10/1972 | Ortolano | 416/199 |
| 3,702,221 | 11/1972 | Ortolano | 416/191 |
| 4,386,887 | 6/1983 | Ortolano | 416/190 |
| 4,533,298 | 8/1985 | Partington et al. | 416/191 |
| 4,662,824 | 5/1987 | Ortolano | 416/196 |
| 4,730,984 | 3/1988 | Ortolano | 416/222 |
| 4,776,764 | 10/1988 | Ortolano | 416/196 |
| 5,026,032 | 6/1991 | Ortolano et al. | 269/43 |
| 5,062,769 | 11/1991 | Ortolano | 416/217 |
| 5,133,643 | 7/1992 | Ortolano | 416/195 |
| 5,146,679 | 9/1992 | Ortolano | 29/889.7 |
| 5,183,244 | 2/1993 | Ortolano et al. | 269/43 |

FOREIGN PATENT DOCUMENTS

| | | | |
|---|---|---|---|
| 306083 | 11/1915 | Germany | 416/190 |
| 0531364 | 8/1931 | Germany | 416/194 R |
| 0728116 | 11/1942 | Germany | 416/190 |
| 0630747 | 10/1949 | United Kingdom | 416/203 |
| 0843287 | 8/1960 | United Kingdom | 416/190 |

OTHER PUBLICATIONS

"Long Arc Shrouding—A Reliability Improvement for Untuned Steam Turbine Blading," R. J. Ortolano, J. A. La Rosa, W. P. Welch, published in Journal of Engineering for Power, vol. 103, Jul. 1981.

Primary Examiner—Edward K. Look
Assistant Examiner—Mark Sgantzos
Attorney, Agent, or Firm—M. G. Panian

[57] ABSTRACT

Vibration in the blade of a turbo-machine is suppressed by the incorporation of both inner and outer restraints that inhibit deflections of the blade foils. The outer restraint comprises shroud, welded lugs or tie wires that divide the row of blades into a plurality of blade groups by connecting the blades in each group together. The number of blades in each group can be equal to the number of blades in the row divided by the harmonic of the rotor rotational frequency that is closest to the blade resonant frequency of concern. The inner restraint comprises welded lugs or tie wires disposed radially inward from the outer restraint that divide each blade group into a plurality of sub-groups, thereby further suppressing blade vibration. Since the length of the inner restraints is less than that associated with harmonic shrouds, the stresses in the inner restraint, as well as in the blades, due to radial growth of the rotor are maintained within acceptable levels.

12 Claims, 4 Drawing Sheets

METHOD AND APPARATUS FOR REDUCING VIBRATION IN A TURBO-MACHINE BLADE

BACKGROUND OF THE INVENTION

The present invention relates to the blades in a turbo-machine. More specifically, the present invention relates to apparatus and methods for reducing vibration in the blades of a turbo-machine, such as a steam turbine, by employing vibration suppressing devices.

The steam flow path of an axial flow steam turbine is formed by a stationary cylinder and a rotor. A large number of stationary vanes are attached to the cylinder in a circumferential array and extend inward into the steam flow path. Similarly, a large number of rotating blades are attached to the rotor in a circumferential array and extend outward into the steam flow path. The stationary vanes and rotating blades are arranged in alternating rows so that a row of vanes and the immediately downstream row of blades form a stage. The vanes serve to direct the flow of steam so that it enters the downstream row of blades at the correct angle. The blade foils extract energy from the steam, thereby developing the power necessary to drive the rotor and the load attached to it.

During operation of a turbo-machine, the rotating blades are subject to oscillatory excitation at frequencies which coincide with integer multiples, referred to as harmonics, of the rotor rotational frequency. Such excitation is referred to as synchronous excitation. Synchronous blade excitation can be created by non-uniformities in the flow of the motive fluid (i.e., steam in the case of a steam turbine) that may vary in space around the circumference of the turbo-machine. Such non-uniformities result from the presence of (i) such features as extraction pipes and reinforcing ribs, and (ii) imperfections in the shape and spacing of the stationary vanes.

Thus, as a result of the oscillatory excitation, turbo-machine blades undergo vibratory deflections that create vibratory stresses in the blades. These vibratory stresses can result in high cycle fatigue cracking if their magnitude is not controlled. This problem is exacerbated by the fact that a turbo-machine blade typically has a number of resonant frequencies associated with its various vibratory modes;— i.e., tangential bending, axial bending, torsional, etc. If the oscillatory excitation to which the blade is subjected is close to one of its resonant frequencies, the vibratory stresses can quickly build up to destructive levels. To avoid this occurrence, in turbomachines with rotors that are intended to operate at, or very near to, a single rotational frequency, the designer attempts to design the larger rotating blades such that at least one, and preferably as many as possible, of the lower resonant frequencies do not coincide with harmonics of the rotor rotational frequency,—typically referred to as "tuning."

However, it is not always possible to predict and control a blade's resonant frequencies with sufficient accuracy to provide sufficient margin between each resonant frequency and the various rotor rotational harmonic frequencies. Also, many turbo-machines are required to operate at a variety of rotational speeds. Even in nominally fixed-speed turbine-generators, rotor harmonic frequencies can change due to under-frequency or over-frequency operation necessitated by electrical system requirements. Moreover, blades can exhibit substantial vibratory responses even at frequencies that are not coincident with harmonics of the rotor rotational frequency.

Hence, excessive vibratory stress can occur during operation. One approach utilized in the past to minimize the vibratory stress, in addition to strengthening the blade, has been to suppress blade vibration by connecting the foils of the blades together at one or more radial locations, thereby constraining deflections at these locations. Various approaches have been used in the past for connecting blade foils together, such as tip shrouds, welded lugs and tie wire. Tip shrouds have the advantage of providing aerodynamic benefits due to control of radial flow and the minimization of leakage past the blade row.

Unfortunately, if all of the blades in a row are coupled by a 360° connection, the connecting device must change its circumferential length whenever its radial position is changed. As a result, the radial growth of the rotor at operating speeds can create stresses in the connecting device that can lead to failure. Traditionally, this problem has been avoided by using a number of connecting device segments, which divide the blades in the row into a number of groups. There are circumferential gaps at the ends of each connecting device segment that allow the connecting devices to accommodate radial growth of the rotor without excessive stresses.

One method of maximizing the effectiveness of the connecting device as a means for reducing vibration is to adjust its length so that the number of blades that the connecting device connects into a group is a function of the blade resonant frequency of concern. Often, this is the resonant frequency of first tangential vibratory mode because this mode can produce especially large resonant stresses and because connecting devices are especially effective in inhibiting vibrations in this mode. Specifically, the number of blades connected by the connecting device is equal to the number of blades in the row divided by the rotor rotational harmonic that is closest to the resonant frequency of the mode under consideration. Thus, if there are 120 blades in the row and the resonant frequency of the first tangential vibratory mode is closest to the 5th harmonic, then five connecting devices are used at each of one or more radial locations, with the length of each connecting device being such that it encompasses 24 blades (120/5=24). Such connecting devices are typically referred to as "harmonic" or "long-arc" and are disclosed in U.S. Pat. No. 3,588,278 (Ortolano), hereby incorporated by reference in its entirety.

However, as a consequence of centrifugal loading, the radius and circumference of the rotor increase with increasing speed, as do the radial locations of the various parts of the foils as well. As a result of the circumferential restraint provided by the harmonic restraints, the aforementioned radial growth can produce large tensile stresses in the harmonic restraints, and large bending stresses in the blade foils and roots. Because the effects of the circumferential restraint are cumulative from the center of the blade group, these stress effects are especially pronounced in and adjacent to the end blades of the groups. Moreover, because the tangential bending stiffness of long turbo-machine blades typically increases drastically as one approaches the base of the foil, these stress effects are typically greater for welded lugs or tie wires that are located away from the tips of the blades, than they are for shrouds that are located at the tips of the blades.

It is therefore desirable to provide a method and apparatus for suppressing blade vibration that provides substantial restraint against foil deflections while not subjecting the blades or the foil restraints to excessive steady stresses.

In some cases, harmonic shrouding has not been entirely effective in preventing blade vibratory failures. Harmonic shrouding does not increase the stiffness of the structure to the same extent as does a continuous 360° structure. The increase in frequency associated with a 360° coupling substantially raises the natural frequencies of all modes, and thus minimizes the number of such modes that can potentially interact with the lower harmonics of rotor rotational speed. Minimizing the number of such lower-harmonic modes is useful because such lower harmonics generally provide substantially greater magnitudes of excitations than do higher harmonics.

The use of a 360° coupling also essentially eliminates responses to modes in which the blade motion is primarily tangential. This is accomplished by the cancellation of variations in tangential input energy around the entire circumference of the blade row.

Moreover, a 360° coupling produces a structure that tends to respond substantially at a single natural frequency for each mode of vibration;—i.e., the frequency that is associated with a nodal-diameter pattern in the disk where the number of nodal diameters is equal to the number of the harmonic of running speed at which the vibration occurs. By contrast, multiply-grouped blades will respond over a range of frequencies because, as a practical matter, the natural frequency of each blade will vary as result of manufacturing variations. Under these conditions, the structure exhibits a primary response at the nodal-diameter pattern associated with the number of the harmonic of running speed. In addition, the structure exhibits various secondary responses associated with other nodal-diameter patterns. The phenomenon of multiple responses for each fundamental mode of the turbine blades is sometimes referred to as "mistuned bladed-disk response."

The range of frequencies for different nodal-diameter patterns of a single blade mode is much larger than the range of the individual natural frequencies of the individual blades or blade groups for that mode. Specifically, the range of the individual blade frequencies is ordinarily controlled to within a few Hz for each mode, but the range of nodal-diameter frequencies for a given mode often exceeds the amount by which the harmonics of rotor speed are separated (60 Hz in the case of a 3600-rpm turbo-machine). For this reason, it is virtually impossible to suppress response at all such frequencies by tuning.

The extent of this problem depends on the magnitude of the secondary responses. In the inventor's experience with multiply-grouped blades, it is not unusual to observe that the strongest of the secondary responses has a magnitude of one-third to one-half of the primary response. Such a magnitude can easily produce vibratory stresses that exceed the fatigue strength of the material. In such a case, the secondary as well as the primary mode must be tuned in order to ensure reliable operation. Tuning such a frequency is difficult at best. In tuning a primary frequency, the designer can make small changes to the foil design that result in relatively large changes in natural frequency. Unfortunately, the separations between the primary frequency and the various secondary frequencies are governed primarily by the flexibility characteristics of the turbine disc and are much more difficult to change substantially within the other constraints that are imposed on a turbine design. The designer is thus faced with the problem of ensuring that two or more natural frequencies will both fall between a single pair of harmonics of running speed, where the range of those natural frequencies is a substantial fraction of the separation between the successive harmonics of running speed.

Even a continuously-coupled structure of non-identical blades can exhibit secondary responses. But because the non-identical blades are more intimately connected to each other, the magnitude of the secondary response can be expected to be much smaller.

In the past, continuous 360° rigid coupling has been achieved by connecting the trailing edge of one blade to the leading edge of the next, in a zig-zag fashion. This approach relies on the torsional flexibility of the blade in its upper portion. Unfortunately, when applied at only the blade tip, this approach is ineffective for long flexible blades, in which tip interconnection alone does not provide adequate stiffness.

Another approach utilizes downward-arched, thin, flexible shroud segments that are riveted through the tips of adjoining blades. When the circumference increases under centrifugal loading, these segments accommodate the required circumferential growth by becoming less arched. However, this approach tends to provide an undesirable interference with steam flow in the vicinity of the blade tip, and does not facilitate sealing against steam flow over the blade tips.

Still other approaches utilize various structures that permit sliding motion between adjoining blades or blade groups. Examples include sliding contact between the faces of shroud segments and/or lashing stubs, tabs fastened below one shroud segment and held by centrifugal force to the underside of the adjoining shroud segment, and sleeves that are placed around lashing stubs or lacing wires. All of these devices provide the additional (and frequently primary) benefit of introducing substantial damping into the structure. They all suffer from the disadvantage that wear can render them ineffective.

With respect to energy cancellation, harmonic grouping has been used to suppress response to a single harmonic of running speed. Unlike harmonic grouping, however, continuous 360° coupling addresses all harmonics of running speed. This is especially important when the primary and substantial secondary responses for a given mode together span a range that is a substantial fraction of the separation between successive harmonics. Harmonic grouping can suppress response at only one of the adjoining harmonics, while continuous coupling can suppress response at both.

Therefore, it desirable to develop a vibration suppression device capable of providing substantially the benefits of a 360° coupling without the problems associated with radial growth at operating speeds.

SUMMARY OF THE INVENTION

Accordingly, it is the general object of the current invention to provide a method and apparatus for suppressing blade vibration that provides substantial restraint against foil deflections while not subjecting the blades or the foil restraints to excessive steady stresses.

Briefly, this object, as well as other objects of the current invention, is accomplished in a turbo-machine, comprising (i) a rotor for rotation at a rotational frequency, whereby multiples of the rotational frequency define a plurality of harmonics of the rotational frequency, (ii) a plurality of radially extending blades, each of the blades having a foil portion and a root portion attached to the rotor, the blades arranged in a row extending circumferentially around the rotor, each of the blades being resonant at a resonant frequency, the resonant frequency being closer to the product of a first one of the rotational harmonics and the rotor rotational frequency than to the product of any other one of the harmonics and the rotor rotational frequency, (iii) first means for suppressing vibration in the blades, the first vibration suppressing means comprising means for dividing the row of blades into a plurality of first blade groups, the first blade group dividing means comprising first connecting means for connecting the foil of each of the blades in each of the first blade groups to the foil of another one of the blades in its respective blade group, and (iv) second means for suppressing vibration in the blades, the second vibration suppressing means comprising means for dividing each of the first blade groups into at least first and second sub-groups, the sub-group dividing means comprising second connecting means for connecting the foil of each of the blades in each sub-group to the foil of another one of the blades in its respective sub-group.

In a preferred embodiment of the invention, the second connecting means is disposed radially inward from the first connecting means and the number of blade groups is equal to the number of the blades in the row divided by the first one of the rotor rotational harmonics.

The current invention also includes a method of suppressing vibration in a turbo-machine having (i) a rotor for rotation at a rotational frequency, (ii) a plurality of radially extending blades, each of the blades having a foil portion and a root portion attached to the rotor, each of the foil portions having a tip portion remote from the root portion, the blades arranged in a row extending circumferentially around the rotor, the number of the blades in the row being equal to N. The method comprises the steps of (i) dividing the row of blades into a plurality of first blade groups, each of the blade groups comprising M number of adjacent blades, M being equal to N/I, wherein I is an integer, by connecting the foil portion of each blade in each of the first blade groups to the foil portion of an adjacent one of the blades in its respective first blade group, and (ii) dividing each of the first blade groups into a plurality of second blade groups by connecting the foil portion of each blade in each of the second blade groups to the foil portion of an adjacent one of the blades in its respective second blade group, the second blade group connecting being done at a location radially inward from the location at which the foil portions are connected in the first blade groups.

The current invention also encompasses a turbo-machine, comprising (i) a rotor for rotation at a rotational frequency, whereby multiples of said rotational frequency define a plurality of harmonics of said rotational frequency, (ii) a plurality of radially extending blades, each of said blades having a foil portion and a root portion attached to said rotor, said blades arranged in a row extending circumferentially around said rotor, each of said blades being resonant at a resonant frequency, said resonant frequency being closer to the product of first one of said rotational harmonics and said rotor rotational frequency than to the product of any other one of said harmonics and said rotor rotational frequency, (iii) first means for suppressing vibration in said blades, said first vibration suppressing means comprising means for dividing said row of blades into a plurality of first blade groups, said first blade group dividing means comprising first connecting means for rigidly connecting said foil of each of said blades in each of said first blade groups to said foil of another one of said blades in its respective blade group, said first connecting means being located at a first radial location, there being no connections between blade foils of adjacent blade groups at said first radial location, and (iv) second means for suppressing vibration in said blades, said second vibration suppressing means comprising means for dividing said row of blades into a plurality of second blade groups, said second blade group dividing means comprising second connecting means for rigidly connecting said foil of each of said blades in each of said second blade groups to said foil of another one of said blades in its respective blade group, said second connecting means being located at a second radial location displaced from said first radial location, there being no connections between blade foils of adjacent blade groups at said second radial location, each of said second blade groups overlapping at least two of said first blade groups.

DESCRIPTION OF THE PREFERRED EMBODIMENTS

Figure 1:
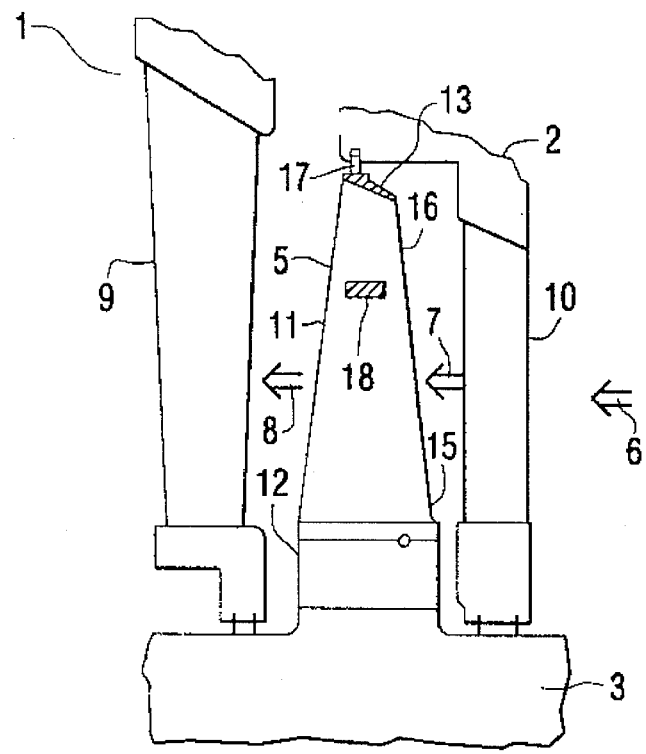
FIG. 1 is a portion of a cross-section through a steam turbine in the vicinity of the row of the blades according to the current invention.

Referring to the drawings, there is shown in FIG. 1 a portion of a cross-section through the low pressure section of a steam turbine 1. As shown, the flow path for the flow of steam 6 is formed by a stationary cylinder 2 and a rotor 3. A row of rotating blades 5 is attached to the periphery of the rotor 3 and extends radially outward into the flow path in a circumferential array. Rows of stationary vanes 9 and 10 are attached to the cylinder 2 and extend radially inward in circumferential arrays immediately downstream and upstream, respectively, of the row of blades 5.

As shown in FIG. 1, each blade 5 is comprised of a foil portion 11 that extracts energy from the steam 6–8 and a root portion 12 that serves to fix the blade to the rotor 3. The foil 11 has a base portion 15 at its proximal end adjacent the root 12 and a tip portion 16 at its distal end remote from the root.

Figure 2A:
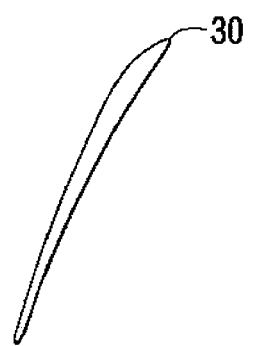
FIGS. 2 (a)–(e) are a series of transverse cross-sections through the blade shown in FIG. 1 at various radial locations.
Figure 2B:
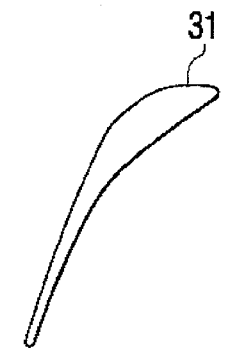
Figure 2C:
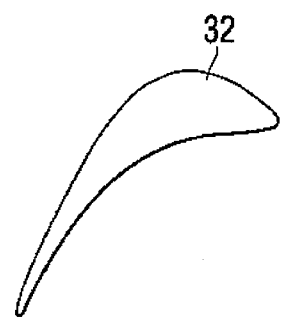
Figure 2D:
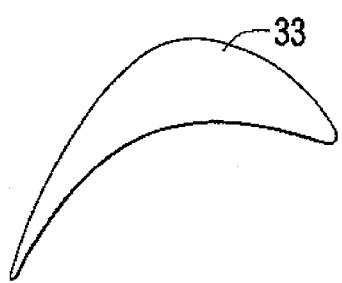
Figure 2E:
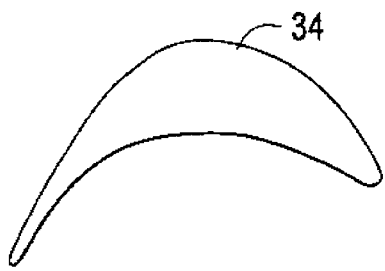

FIG. 2 shows transverse cross-sections of the foil 11 at five radial locations:— specifically cross-section 30, shown in FIG. 2(a), is taken at the tip 16 of the foil; cross-section 31, shown in FIG. 2(b), is taken at 25% height; cross-section 32, shown in FIG. 2(c), is taken at mid-height; cross-section 33, shown in FIG. 2(d), is taken at 75% height; and cross-section 34, shown in FIG. 2(e), is taken at the base 15 of the foil. As can be seen, the blade foil 11 undergoes considerable change in its cross-sectional shape as it extends from its base portion 15 to its tip 16. The cross-section 34 at the foil base 15 is much stiffer, due to its increased thickness and camber, than the cross-section 30 at the foil tip 16, which is essentially a flat plate.

Referring again to FIG. 1, a shroud 13 is located at the foil tip 16. The shroud may be formed from shroud segments that are integrally formed on each blade tip 16, as disclosed in U.S. Pat. No. 4,533,298 (Partington et al.), herein incorporated by reference in its entirety, and then welded together to form blade groups 22, as discussed below. Alternatively, the shroud 13 may be formed by attaching a ring segment to the tips 11 of a number of foils 11, such as by rivetting as disclosed in U.S. Pat. No. 5,146,679 (Ortolano), herein incorporated by reference in its entirety. The shroud 13, in conjunction with a seal 17, serves to minimize the leakage of steam past the blade row.

Figure 3:
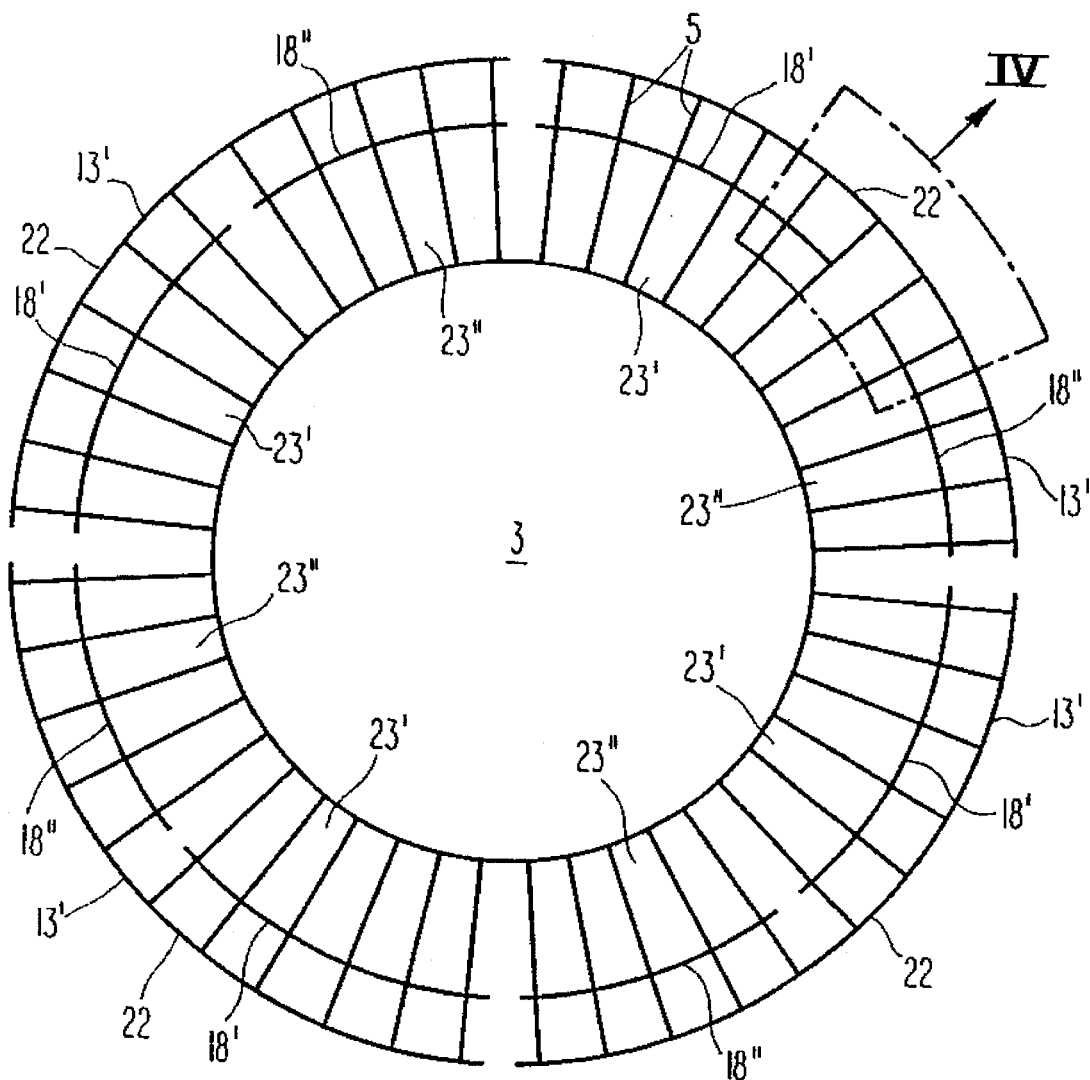
FIG. 3 is a view, partially schematic, of the row of blades shown in FIG. 1.

In addition to minimizing steam leakage, the shroud 13 also forms a primary blade foil 11 deflection restraint that serves to suppresses blade vibration. As shown in FIG. 3, the blades 5 are installed into the rotor 3 so that there are 44 blades in the row. (The number of blades has been chosen to simplify illustration since, as those skilled in the art will readily appreciate, the number of blades in a lashed and/or shrouded row of a steam turbine typically is larger than that shown). In the example shown, the blade 5 has a resonant frequency in its first tangential bending mode at about 250 Hz and the steam turbine is designed to operate at a steady state rotor speed of 3600 RPM (i.e., 60 Hz). Thus, the first mode resonant frequency is close to the 4th harmonic (i.e., 4×60 Hz=240 Hz).

Figure 4:
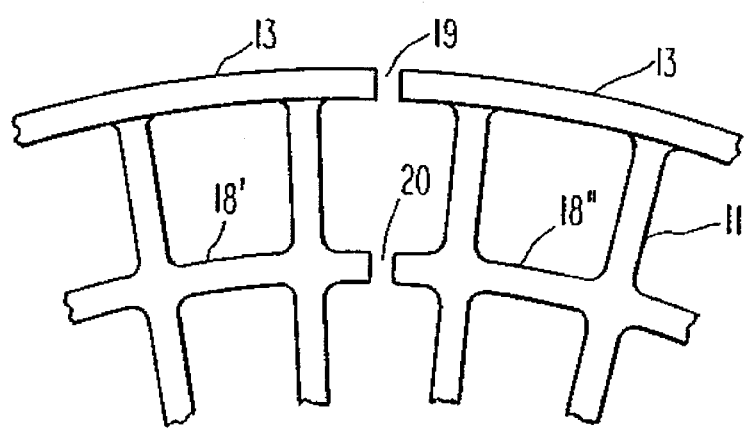
FIG. 4 is a enlarged view of the portion of FIG. 3 enclosed by the circle marked IV.

Therefore, as shown in FIG. 3, the shroud 13 is comprised of four shroud segments 13', each of which is sufficiently long to rigidly connect the tips 16 of the foils 11 of eleven blades (44/4=11) according to the traditional harmonic shrouding approach previously discussed. Thus, the shroud segments 13' divide the blades 5 into four groups 22, each group consisting of M adjacent blades, M being equal to N/I, where N is the total number of blades 5 in the row and I being the number of the rotor rotational harmonic that is closest to the blade resonant frequency of concern. As shown in FIG. 4, as is conventional, the shroud segments 13' are not connected to each other, there being a gap 19 formed between each, so that the shroud segments do not constrain the radial growth of the rotor 3 at operating speed.

According to the current invention, secondary blade foil deflection restraints 18 are utilized to rigidly connect blade foils together at a location radially inward from the harmonic shroud segments 13' to further suppress blade vibration. The secondary restraints 18 may be created by integrally formed lugs extending from each side of each blade foil 11 that are welded together between adjacent blades to create connections, as shown in FIG. 4. Alternatively, the secondary restraints 18 may be formed by tie wires that extend between the blades. Such lugs and tie wires are disclosed in the aforementioned U.S. Pat. No. Re 32,737.

According to an important aspect of the current invention, the secondary restraints 18 encompass less blades than that of a harmonic shroud. In the example shown in FIG. 3, two secondary restraints 18' and 18" are incorporated into each blade group 22 so that the secondary restraints divide each blade group into two sub-groups 23' and 23", respectively. The first sub-group 23' consists of six blades 5 and the second sub-group 23" consists of five blades. Although the secondary restraints 18' and 18" serve to further suppress blade vibration, since they are shorter than the harmonic shrouds 13' they do not impose as great a constraint to the radial growth of the rotor 3 at operating speed. Thus, the bending stresses that the secondary restraints 18' and 18" impart to the blade foils 11 are reduced. Moreover, the stress created within the secondary restraints 18' and 18" as a result of radial growth of the rotor is also reduced.

Although only two secondary restraints 18' and 18" are utilized within each blade group 22 in the example shown, shorter restraints that divide each blade group into three or more sub-groups could also be utilized. According to the current invention, the length of each secondary restraint, and, therefore, the number of blades within each sub-group 23, is a function of the radial location of the secondary restraint. As previously discussed, the stiffness of the blade foil 11 varies along its height;—specifically, it becomes progressively stiffer as the base 15 of the foil is approached. Thus, the further away from the tip 16 the secondary restraints are located the shorter they should be.

In general, the radial location of the secondary restraints should be set to provide optimum vibration suppression for the particular vibratory mode of concern. Moreover, in addition to suppressing foil deflections, the secondary restraints also alter the resonant frequency of the blade 5. Therefore, the radial location of the secondary restraints can also be based on the location that will provide the optimum resonant tuning;—for example, to move the blade resonant frequency further away from a rotor rotational harmonic. In conjunction with the selection of the radial location for the secondary restraint, according to the current invention, the number of blades that each secondary restraint encompasses is selected based on the radial stiffness distribution along the blade foil 11;—that is, the stiffer the blade at the location of the restraint, the shorter the restraint must be. Using this method, the secondary restraints can be sized so that they neither impose excessive bending stresses on the foil nor are subject to excessive stresses themselves as a result of radial growth in the rotor 3 at operating speed.

Figure 5:
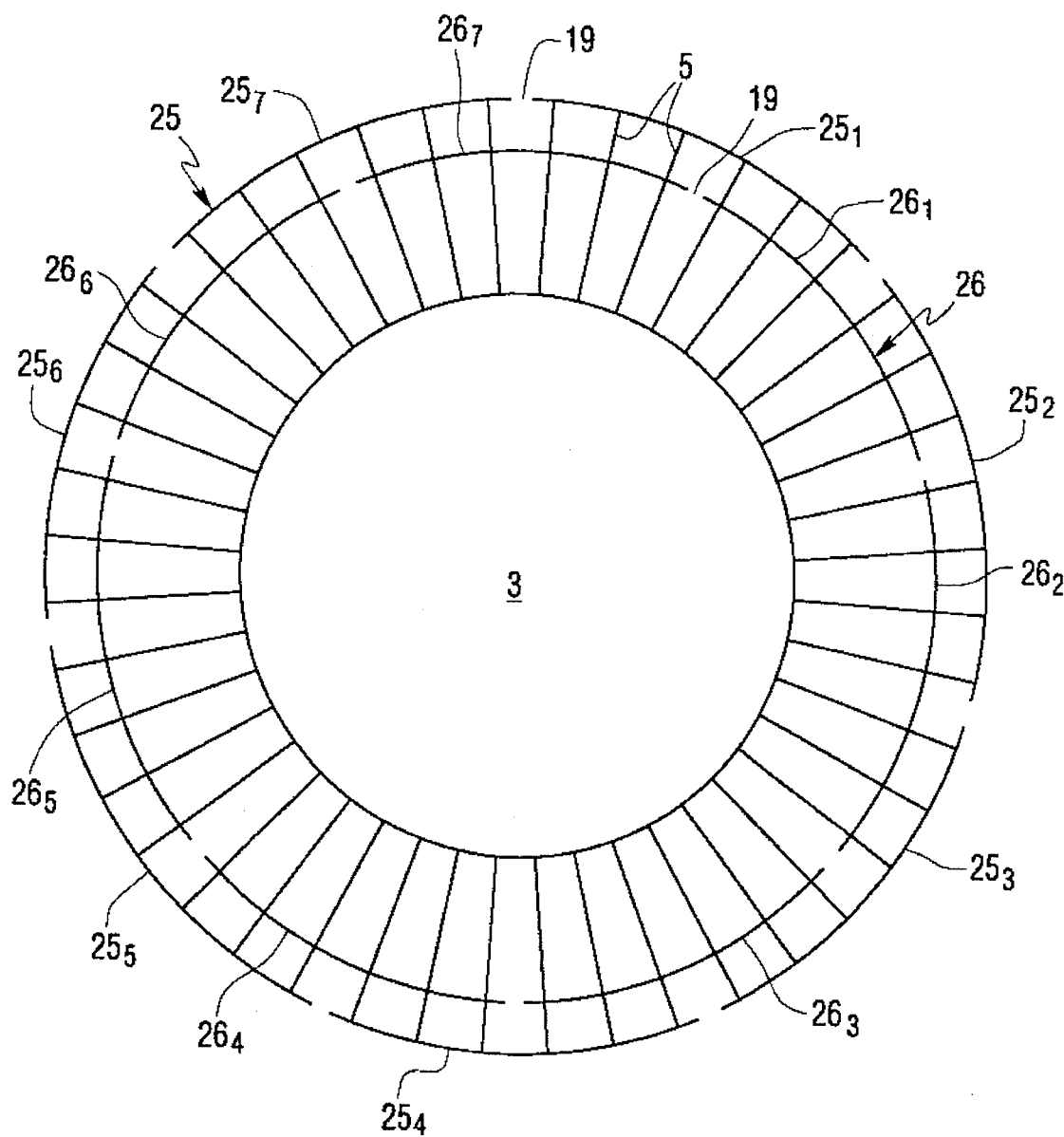
FIG. 5 is a view similar to FIG. 3 showing an alternate embodiment of the invention.

FIG. 5 shows another embodiment of the current invention. In this embodiment, the primary blade foil deflection restraint is formed by a tip shroud 25 that connects the tips 16 of a number of blade foils 11 together in groups, as before, to form outer blade groups. However, the size of the blade groups formed by the shroud 25 (—that is number of blades 5 encompassed by each shroud segment, and therefore, the length of the shroud segment)—is less than that of a harmonic shroud. Thus, the outer blade groups that are formed by shroud segments $25_1$, $25_3$, $25_4$, $25_6$, and $25_7$ each encompass six blades 5 and the outer blade groups that are formed by shroud segments $25_2$ and $25_5$ each encompass seven blades.

A secondary restraint 26 is disposed radially inward from the primary restraint 25 and serves to rigidly connect blade foils together, as before, thereby forming inner blade groups. In addition, the secondary restraint 26 may be formed from welded lugs or tie wire, as previously discussed. However, in this embodiment, each secondary restraining device encompasses approximately the same number of blades 5 as each primary restraining device;—that is, the number of blades in the inner and outer blade groups is approximately the same. Thus, the inner blade groups that are formed by the secondary restraining devices $26_1$, $26_3$, $26_4$, $26_6$, and $26_7$ each encompass six blades 5 and the inner blade groups that are formed by the secondary restraining devices $26_2$ and $26_5$ each encompass seven blades.

Moreover, the first blade in each inner blade group is offset by approximately one-half of the outer blade group so that each secondary restraining device spans two adjacent primary restraining devices. Thus, the inner blade group formed by inner restraining device $26_1$ spans the outer blade groups formed by shroud segments $25_1$ and $25_2$, etc. As a result of this arrangement, each blade is connected to the blades on either side of it, unlike the embodiment shown in FIG. 3, in which the first and last blades in each group are connected to only one other blade. Consequently, according to this embodiment, although each individual restraint is sufficiently short to prevent the buildup of excessive stresses due to radial growth in the rotor 3 at operating speed, the combined effect of the inner and outer restraints is to achieve essentially the benefits of a 360° restraint, such as a 360° tip shroud.

It is important to note that, unlike the approach utilized in the prior art—(see, U.S. Pat. No. 4,662,824 (Ortolano)—in the embodiment shown in FIG. 5, there are no connections, even flexible connections, between adjacent blade groups along the outer restraints 25, nor are there any connections, even flexible connections, between adjacent blade groups along the inner restraints 26. Thus, by taking the stiffness into account in sizing the restraints, according to the principles of the current invention, the restraints can be utilized at locations in which the blade is fairly stiff. This allows the restraints to be located so as to maximize their ability to suppress deflections and tune the resonant frequency of the vibratory mode of concern, thereby eliminating the need for flexible connections between adjacent blade groups in order to sufficiently suppress vibrations.

Figure 6:
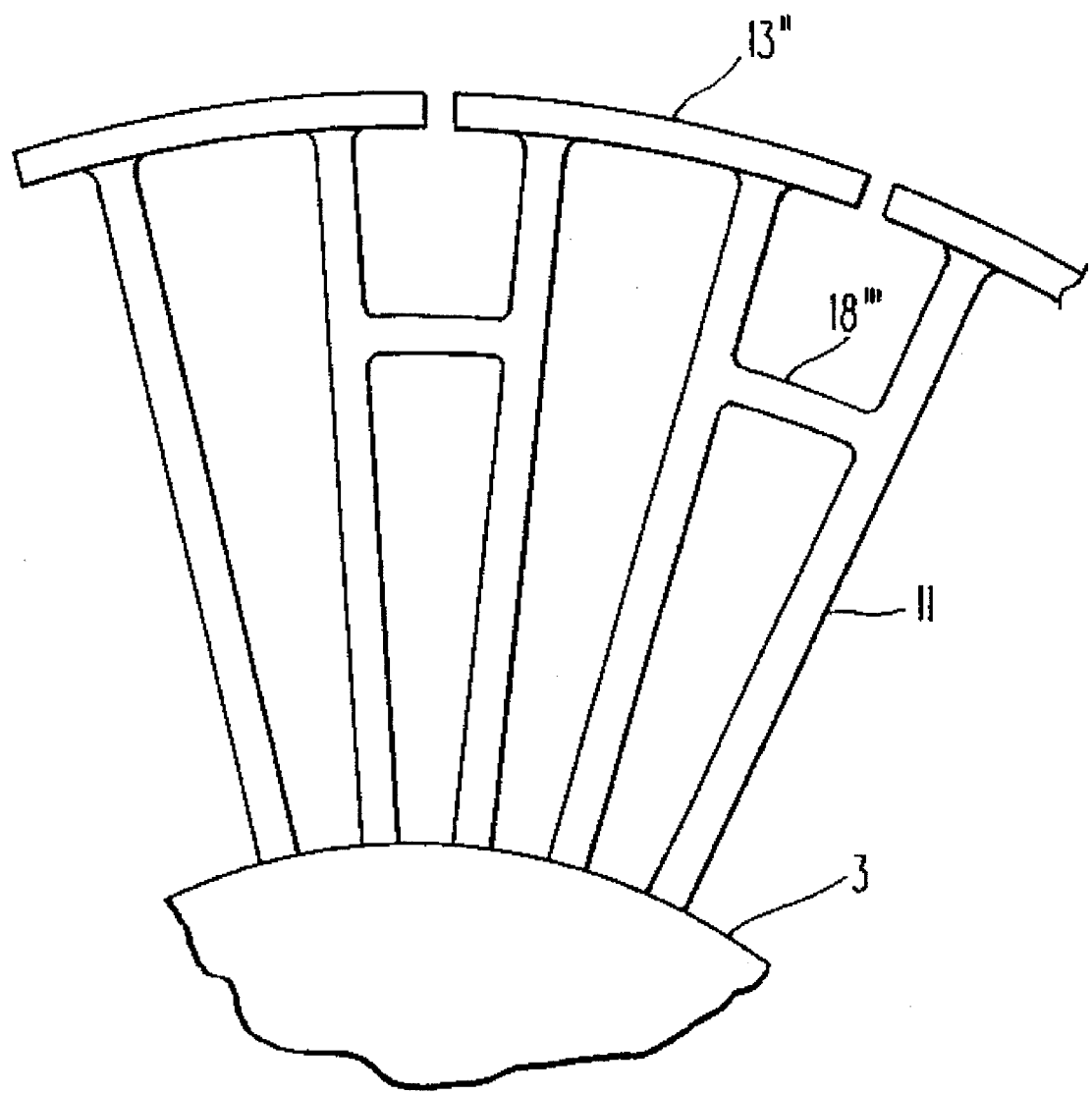
FIG. 6 is a partial view, similar to FIG. 4, showing yet another embodiment of the invention.

FIG. 6 shows another embodiment of the invention is which the benefits of a 360° coupling are realized by utilizing both a tip restraint 13" and an inboard restraint 18". However, in this embodiment, the circumferential extent of each restraint is limited to the coupling of two adjacent blades. Once again, although each individual restraint is sufficiently short to prevent the buildup of excessive stresses due to radial growth in the rotor 3 at operating speed, the combined effect of the inner and outer restraints, if correctly located, is to achieve essentially the benefits of a 360° restraint, such as a 360° tip shroud. This embodiment is especially useful in situations where more than a single response frequency is of interest. Such situations can occur in fixed-speed turbine-generators when more than one vibration mode is of concern, in turbine-generators that are required to operate off-frequency (i.e., at other than their normal speed) because of electrical system demands, and in drive turbines that serve a variable speed load (e.g., pumps, ship propulsion, etc.).

Although the present invention has been illustrated in conjunction with primary vibratory suppression that is accomplished by harmonic tip shrouds, the invention is also applicable to situations in which the primary vibration suppression device is itself located inboard of the blade tips—(for example, by tie wires or lugs)—as well as situations in which the number of blades encompassed by the primary vibration suppression device is other than that required for harmonic shrouding. Also, although the present invention has been illustrated as suppressing the first tangential vibratory mode, the invention is also applicable to suppressing other vibratory modes as well. Although the present invention has been illustrated with reference to a blade in a steam turbine, the invention is also applicable to blades in other types of turbo-machines, such as gas turbines. Thus, the present invention may be embodied in other specific forms without departing from the spirit or essential attributes thereof and, accordingly, reference should be made to the appended claims, rather than to the foregoing specification, as indicating the scope of the invention.

I claim:

1. A turbo-machine comprising:
   a) a rotor for rotation at a rotational frequency, whereby multiples of said rotational frequency define a plurality of harmonics of said rotational frequency;
   b) a plurality of radially extending blades, each of said blades having a foil portion and a root portion attached to said rotor, said blades arranged in a row extending circumferentially around said rotor, each of said blades being resonant at a resonant frequency, said resonant frequency being closer to a product of a first one of said rotational harmonics and said rotor rotational frequency than to a product of any other one of said harmonics and said rotor rotational frequency;
   c) first means for suppressing vibration in said blades, said first vibration suppressing means comprising means for dividing said row of blades into a plurality of first blade groups, said first blade group dividing means comprising first connecting means for connecting said foil of each of said blades in each of said first blade groups to said foil of another one of said blades in its respective blade group; and
   d) second means for suppressing vibration in said blades disposed radially inward from said first connecting means, said second vibration suppressing means comprising means for dividing each of said first blade groups into at least first and second sub-groups, said sub-group dividing means comprising second connecting means for connecting said foil of each of said blades in each of said sub-group to said foil of another one of said blades in its respective sub-group.

2. The turbo-machine according to claim 1, wherein said first connecting means comprises a shroud formed between each of said blades in each of said groups.

3. The turbo-machine according to claim 2, wherein each of said blade foils has a tip portion remote from said root portion, and wherein said shrouds are disposed at said blade foil tips.

4. The turbo-machine according to claim 1, wherein the number of blade groups is equal to the number of said blades in said row divided by said first one of said rotor rotational harmonics.

5. The turbo-machine according to claim 4, wherein the number of blades in each of said blade groups are equal.

6. The turbo-machine according to claim 5, wherein the number of said blades in each of said sub-groups is equal.

7. The turbo-machine according to claim 4, wherein said resonant frequency is a tangential mode vibration frequency.

8. The turbo-machine according to claim 1, wherein the number of blade groups is less than the number of said blades in said row divided by said first one of said harmonic frequencies.

9. A turbo-machine, comprising:
   a) a rotor for rotation at a rotational frequency;
   b) a plurality of radially extending blades, each of said blades having a foil portion and a root portion attached to said rotor, each of said foil portions having a tip portion remote from said root portion, said blades arranged in a row extending circumferentially around said rotor, the number of blades in said row being equal to N;
   c) means for forming a plurality of first blade groups, each of said blade groups comprising M number of adjacent blades, M being equal to N/I, wherein I is an integer, said means for forming said first blade groups comprising first means for joining said foil portion of each blade in each of said first blade groups to said foil portion of an adjacent one of said blades in its respective first blade group; and
   d) means for forming a plurality of second blade groups within each of said first blade groups, said means for forming said second blade groups comprising second means for joining said foil portion of each blade in each of said second blade groups to said foil portion of an adjacent one of said blades in its respective second blade group, said second foil joining means being spaced radially inward from said first foil joining means.

10. The turbo-machine according to claim 9, wherein said blade foil has a stiffness that varies along the length thereof, wherein a distance by which said second foil joining means is spaced from said first foil joining means is a function of said radial stiffness variation.

11. The turbo-machine according to claim 9, wherein integer multiples of said rotor rotational frequency define harmonics of said rotational frequency, each of said blades being resonant at a resonant frequency, a first one of said harmonics of said rotor rotational frequency being proximate to said resonant frequency, and wherein I is equal to said first harmonic.

12. A turbo-machine comprising a row of rotating blades arranged in a circumferential array such that each of said blades is disposed between first and second adjacent blades, each of said blades having a foil which has a stiffness that varies along its length, each of said foils being rigidly coupled to said first adjacent blade foil only at a first radial location, each of said foils being rigidly coupled to said second adjacent blade foil only at a second radial location different from said first radial location, wherein a distance by which said second radial location is spaced from first radial location is a function of said radial stiffness variation.

* * * * *